(12) United States Patent
Symes

(10) Patent No.: US 6,687,771 B2
(45) Date of Patent: Feb. 3, 2004

(54) PARALLEL PROCESSING OF MULTIPLE DATA VALUES WITHIN A DATA WORD

(75) Inventor: Dominic Hugo Symes, Cherry Hinton (GB)

(73) Assignee: ARM Limited, Cambridge (GB)

( * ) Notice: Subject to any disclaimer, the term of this patent is extended or adjusted under 35 U.S.C. 154(b) by 427 days.

(21) Appl. No.: 09/769,498

(22) Filed: Jan. 26, 2001

(65) Prior Publication Data

US 2002/0002671 A1 Jan. 3, 2002

(30) Foreign Application Priority Data

May 23, 2000 (GB) .......................................... 0012539

(51) Int. Cl.$^7$ ............................................. G06F 7/48
(52) U.S. Cl. .................... 710/62; 708/313; 708/316; 382/300; 382/293; 382/276; 382/162; 348/36; 348/448
(58) Field of Search ............................ 710/62; 708/316, 708/313; 382/162, 293, 276, 300; 348/36, 448

(56) References Cited

U.S. PATENT DOCUMENTS

| | | | | |
|---|---|---|---|---|
| 4,746,903 A | * | 5/1988 | Czarniak et al. ............ 340/347 |
| 5,760,726 A | * | 6/1998 | Kifman et al. ............... 341/145 |
| 6,205,252 B1 | * | 3/2001 | Nguyen et al. ............. 382/234 |
| 6,219,777 B1 | * | 4/2001 | Inoue ........................... 712/23 |
| 6,295,322 B1 | * | 9/2001 | Arbeiter et al. ............. 375/240 |
| 6,424,753 B1 | * | 7/2002 | Yamaguchi ................. 382/300 |
| 6,456,329 B1 | * | 9/2002 | Tinker et al. ............... 348/448 |
| 6,466,253 B1 | * | 10/2002 | Honjoh ........................ 348/36 |
| 6,487,572 B2 | * | 11/2002 | Kamiya et al. ............. 708/313 |
| 6,611,625 B1 | * | 8/2003 | Son et al. .................... 382/238 |

FOREIGN PATENT DOCUMENTS

| | | |
|---|---|---|
| EP | 0 486 143 | 5/1992 |
| EP | 0 602 887 | 6/1994 |
| EP | 0 602 888 | 6/1994 |
| EP | 0 661 624 | 7/1995 |

* cited by examiner

*Primary Examiner*—Jeffrey Gaffin
*Assistant Examiner*—Abdelmoniem Elamin
(74) *Attorney, Agent, or Firm*—Nixon & Vanderhye P.C.

(57) ABSTRACT

An input data word contains multiple abutting input data values An. The input data word is split into two intermediate data words into which respective high order portions and low order portions of the data values are written spaced apart by vacant portions. Each intermediate data word may then be subject to one or more data processing operations with bits of the results extending into the vacant portions without corrupting adjacent data values. Finally, the intermediate data words may be recombined to produce result data values.

14 Claims, 5 Drawing Sheets

FIG. 4.

| | A0 | A1 | A2 | A3 | A4 | |
|---|---|---|---|---|---|---|
| 32 | 0010 (2) | 1011 (11) | 0100 (4) | 0001 (1) | 1100 (12) | |
| 34 R1= | | 0011 | 0000 | 0001 | 0000 | ; LOW |
| 36 R2= | | 0010 | 0001 | 0000 | 0011 | ; HIGH |
| 38 ROUND= | | 0001 | 0001 | 0001 | 0001 | ; ROUND SET TO +1 |
| 40 MASK= | | 0011 | 0011 | 0011 | 0011 | ; SET MASK |
| 42 $OUT_l$= | | 0101 | 0000 | 0001 | 0000 | ; $A0_l + A1_l$ |
| 44 $OUT_l$= | | 0101 | 0011 | 0001 | 0001 | ; $A1_l + A2_l, A2_h, A2_l + A3_l, A3_h, A3_l + A4_l$ |
| 46 $OUT_h$= | | 0010 | 0001 | 0000 | 0011 | ; $A0_h + A1_h$ |
| 48 $OUT_h$= | | 0010 | 0011 | 0001 | 0001 | ; $A1_h + A2_h, A2_h + A3_h, A3_h + A4_h$ |
| 50 $OUT_l$= | | 0110 | 0100 | 0010 | 0010 | ; $A1_l + R, A2_l + R, A3_l + R, A4_l + R$ |
| 52 $OUT_l$= | | 0011 | 0010 | 0001 | 0001 | ; MASK AND $\overrightarrow{OUT_l}$ $\overleftarrow{1}$ $\overrightarrow{OUT_h}$ |
| 54 OUT= | | 0111 (7) | 1000 (8) | 0011 (3) | 0111 (7) | ; $OUT_l + OUT_h$ |

P = (NW +NE + SW + SE + R) /4

SW + SE

SW + SE +NW + NE + ROUNDING

PARALLEL PROCESSING OF MULTIPLE DATA VALUES WITHIN A DATA WORD

BACKGROUND OF THE INVENTION

1. Field of the Invention

This invention relates to data processing. More particularly, this invention relates to data processing systems in which it is desired to perform parallel data processing upon a plurality of data values within a data word.

2. Description of the Prior Art

As data processing systems have developed, data path widths have generally become greater. This has led to the increased possibility that data values which it is desired to process may be much narrower in bit width than the data paths available through the processing hardware. As an example, if the processing hardware provides for 32-bit data processing operations to be performed, but the data values being processed are only 8-bit data values, then it is disadvantageously inefficient to separately process the 8-bit data values upon the much more capable 32-bit data paths.

A known technique for making better use of the data processing resources available in the above circumstances is "single instruction multiple data" instructions. These special purpose instructions effectively allow multiple data values to be embedded within a data word passing along the data paths of the system with processing operations being performed in parallel upon the plurality of data values embedded within each data word. The instructions control the hardware in a manner that ensures that the results of the processing of one data value are not allowed to interfere with the results of the processing of another data value, e.g. the carry chain of an adder is interrupted at positions between the data values such that a carry from the processing of one data value does not propagate into a neighbouring data value.

Whilst the provision of single instruction multiple data instructions does allow advantageous parallel processing of data values within a single data word, it suffers from the disadvantage that it occupies bit space within the instruction bit space of the data processing apparatus concerned and requires the provision of extra circuitry. Instruction bit space is a valuable resource within a data processing system architecture and increased circuit requirements increase cost, size, power consumption etc. A further disadvantage of the single instruction multiple data instruction approach is that the divisions between data values within a data word are determined by the hardware of the system which gives reduced flexibility in the way the system may be used, e.g. the hardware may assume that the data values are 16-bit data values with two data values being stored within a 32-bit data word, whereas a particular processing requirement might be to handle 8-bit data values, which make relatively inefficient use of a 16-bit data channel provided for them within the single instruction multiple data arrangement.

A further feature of many data processing systems is that data values to be processed in parallel are packed together within the memory of the data processing system in an abutting manner. Accordingly, if the data values to be processed are 8-bit byte values, then these will typically be stored as adjacent data values within a memory system with a plurality of these 8-bit byte values being read simultaneously as, for example, a 32-bit word from the memory system. In these circumstances, if it is desired to separately process the data values, then they must be unpacked from the data word in which they were all read, separately processed, and then repacked within a result data word prior to being stored back to the memory. The processing overhead of the unpacking and re-packing is disadvantageous.

Furthermore, the need to conduct such packing and re-packing and the inefficiency of separately processing data values frequently arises in circumstances, such as video data processing, which are already demanding considerable processing resources and so can ill afford the extra processing requirements.

SUMMARY OF THE INVENTION

Viewed from one aspect the present invention provides a method of processing an input data word containing a plurality of abutting input data values, each input data value containing a plurality of multi-bit portions, said method comprising the steps of:

(i) splitting said multi-bit portions of said input data values between a plurality of intermediate data words, each intermediate data word containing a plurality of said multi-bit portions taken from respective input data values, said multi-bit portions being separated by vacant portions within said intermediate data words;

(ii) performing one or more data processing operations upon said intermediate data words, said data processing operations being such that, within at least one of said intermediate data words, a multi-bit data portion may at least temporarily extend in length into a vacant portion of said intermediate data word and one or more data processing operations performed upon at least one intermediate data word differs from one or more data processing operations performed upon a different intermediate data word; and (iii) combining said intermediate data words to form an output data word containing a plurality of abutting output data values each formed from a plurality of separately processed multi-bit data portions taken from respective intermediate data words.

The invention allows for multiple data values within a data word to be processed in parallel at the cost of having to first split those data values into at least two multi-bit portions with vacant portions between them within an intermediate data word and then having to perform the data processing operations on the two or more intermediate data words. The invention recognises that the disadvantage of having to perform the data processing operations upon more than one intermediate data word is more than outweighed by the ability to process portions of a plurality of data words within each intermediate data word. Moreover, this parallel processing of data values is achieved without the need to provide special purpose single instruction multiple data instructions. This saves instruction bit space that may then be used for other purposes and furthermore has the advantage that there is no hardware constraint upon the way in which a data word is divided to provide for multiple data values.

It will be appreciated that the data processing operations and combination step could take a wide variety of forms. In some circumstances a controlled interaction between the results of processing adjacent data values may be tolerable or desired. However, in preferred embodiments of the invention the steps of performing one or more data processing operations and combining together yield output data values equal to those that would be obtained by performing a desired data processing operation upon said input data values within said input data word in isolation from any abutting input data values.

The data processing operations being performed upon the intermediate data words could take many different forms.

However, the invention is particularly well suited to situations in which the desired data processing operations to be performed upon the data values include one or more of addition and shifting. These data processing operations are ones in which abutting data values within a data word would normally undesirably interfere with one another and so the provision of vacant portions within the intermediate data words enables these interactions to be overcome.

The invention is particularly well suited to the processing of data values representing a stream of signal values, such as pixel values. It is common for such signal data values to be of a lower bit width than the capabilities of the data path of the system processing them coupled with the common circumstance that such signal data values often require processing in considerable volumes such that improvements in the efficiency in which these signal values may be handled are highly advantageous.

A preferred feature of the invention is that certain data processing operations need only be performed upon one of the intermediate data values. A common example of this is the need to perform a rounding operation. Preferred embodiments of the invention allow the rounding of multiple data values to be performed in parallel by an operation conducted upon only one of the intermediate data words.

It will be understood that the input data values could be split between two or more intermediate data words. However, preferred embodiments of the invention split the input data values between two intermediate data words. Two intermediate data words allow for the provision of vacant portions between multi-bit portions of the input data values whilst keeping the increase in the number of data processing operations that need to be performed upon the separate intermediate data words to a low level.

The techniques of the invention have been found particularly well suited to circumstances in which it is desired to average a plurality of adjacent data values, such as by utilising a shifted add on top operation upon the intermediate data words.

Whilst the bit widths of the data path and the data values may take a variety of values, the gains in efficiency have been found to be particularly high in the case where the input data word is a 32-bit input data word, the input data values are 8-bit input data values and the split is performed into high-order 4-bit multi-bit portions and low-order 4-bit multi-bit portions.

Viewed from another aspect the invention provides apparatus for processing an input data word containing a plurality of abutting input data values, each input data value containing a plurality of multi-bit portions, said apparatus comprising:

(i) splitting logic operable to split said multi-bit portions of said input data values between a plurality of intermediate data words, each intermediate data word containing a plurality of said multi-bit portions taken from respective input data values, said multi-bit portions being separated by vacant portions within said intermediate data words;

(ii) processing logic operable to perform one or more data processing operations upon said intermediate data words, said data processing operations being such that, within at least one of said intermediate data words, a multi-bit data portion may at least temporarily extend in length into a vacant portion of said intermediate data word and one or more data processing operations performed upon at least one intermediate data word differs from one or more data processing operations performed upon a different intermediate data word; and (iii) combining logic operable to combine said intermediate data words to form an output data word containing a plurality of abutting output data values each formed from a plurality of separately processed multi-bit data portions taken from respective intermediate data words.

The invention also provides a computer program for controlling computer hardware in accordance with the above techniques.

The above, and other objects, features and advantages of this invention will be apparent from the following detailed description of illustrative embodiments which is to be read in connection with the accompanying drawings.

BRIEF DESCRIPTION OF THE DRAWINGS

FIG. 4 is a worked example of the technique illustrated in FIG. 3;

DESCRIPTION OF THE PREFERRED EMBODIMENTS

Figure 1:
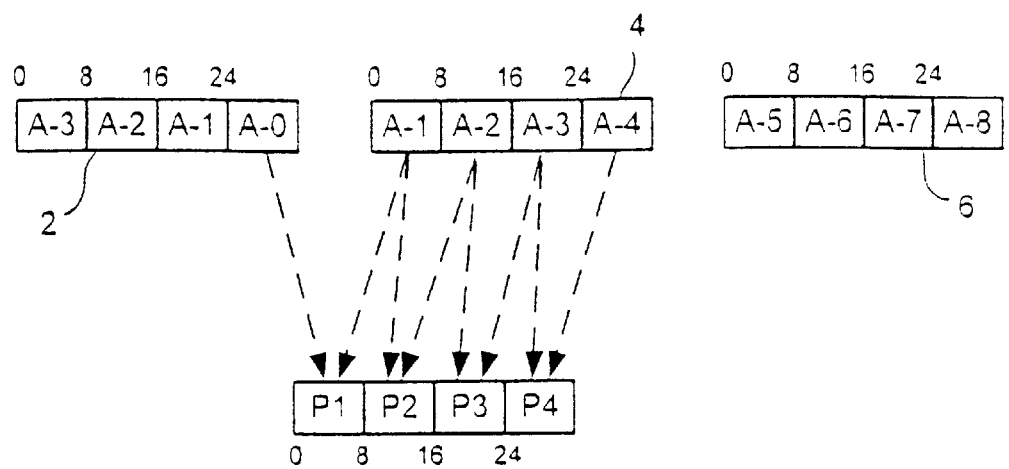
FIG. 1 schematically illustrates a pixel averaging operation between abutting adjacent pixel values within a data word.

FIG. 1 shows a plurality of input data words 2, 4, 6 within a stream of signal values. Each input data word 2, 4, 6 includes four 8-bit horizontally adjacent pixel values An. A common data processing requirement within the MPEG field is to interpolate pixel values Pn at the mid-points between pixel values contained within the data stream. In the case illustrated in FIG. 1, the interpolated pixels it is desired to calculate are at the same vertical level as the pixels within the data stream but are positioned mid-way between horizontally adjacent pixel values within the data stream. Accordingly, a one-dimensional horizontal interpolation is needed.

The interpolated pixel values Pn are calculated by adding together adjacent pixel values An and An+1 within the data stream, adding a rounding value R defined for that pixel data within the MPEG data stream and then dividing by 2.

Each of the input data words 2, 4, 6 may be retrieved and processed within a 32-bit data processing system as a single entity. However, a problem arises in that the pixel values An abut within the input data words 2, 4, 6 and accordingly can overflow or underflow into one another when standard data processing operations are performed on the 32-bit data words. Whilst it would be possible to unpack each of the pixel values An into a separate 32-bit data word and then separately process them, this would be highly inefficient and slow the processing.

Figure 2:
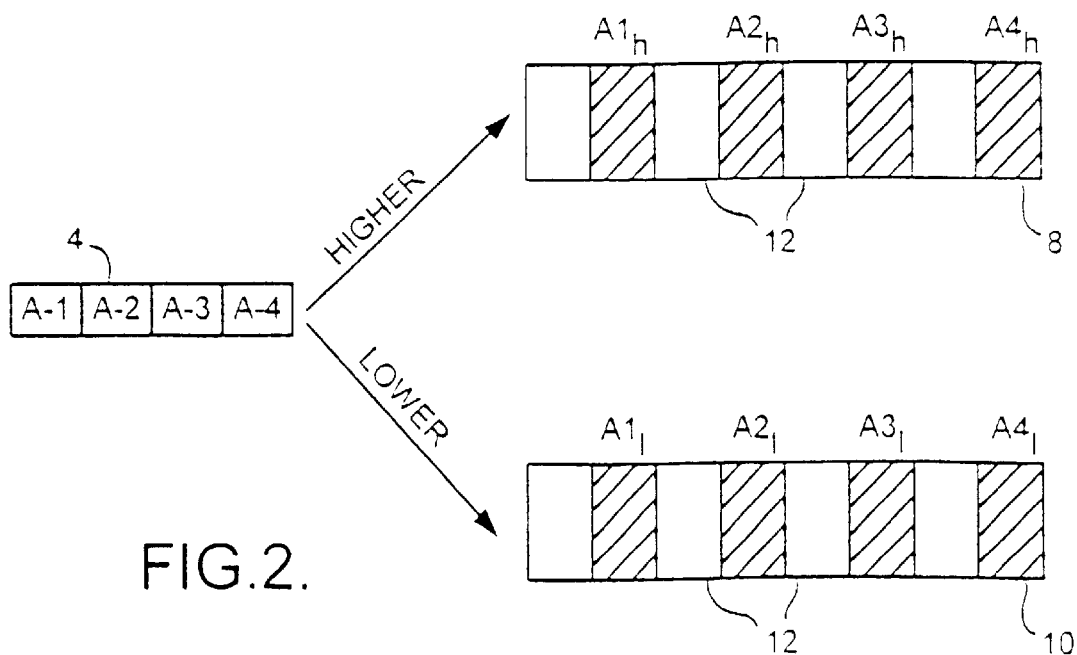
FIG. 2 schematically illustrates the splitting of an input data word into two intermediate data words.

FIG. 2 illustrates the splitting of an input data word 4 into two intermediate data words 8, 10. The first intermediate data word 8 contains the four high-order bits of each pixel value within the input data word 4 spaced apart by four-bit vacant portions 12. The high-order 4-bit portions Anh of each pixel value An form multi-bit portions that may be processed together in parallel by a data processing operation performed upon the intermediate data word 8. The low-order 4-bits Anl of each pixel value An of the input data word 4 are similarly found within the second intermediate data word 10 spaced apart by vacant portions 12.

ARM code (as executed by an ARM processor produced by ARM Limited, Cambridge, Great Britain) for performing a horizontal interpolation as illustrated in FIG. 1 is given below:

ADD outl, R1, A0l, LSR#24; add in previous pixel low part
    ADD outl, outl, R1, LSL#8 ; do low part of A1+A2, A2+A3, A3+A4
    ADD outh, R2, A0h, LSR#24; add in previous pixel hi par
    ADD outh, outh, R2, LSL#8 ; do high part of A1+A2, A2+A3, A3+A4
    ADD outl, outl, round ; round all 4 pixels
    AND outl, mask, outl, LSR#1; divide all 4 pixels by 2
    ADD out, outl, outh, LSL#3; recombines low and hi parts Prior to executing the above code, the input data words 2, 4, 6 are split into intermediate data words as illustrated in FIG. 2 using a combination with a mask value and, in the case of the high-order bits, a shift. Accordingly, register R1 contains the low-order multi-bit portions Anl and the register R2 contains the high-order multi-bit portions Anh.

Figure 3:
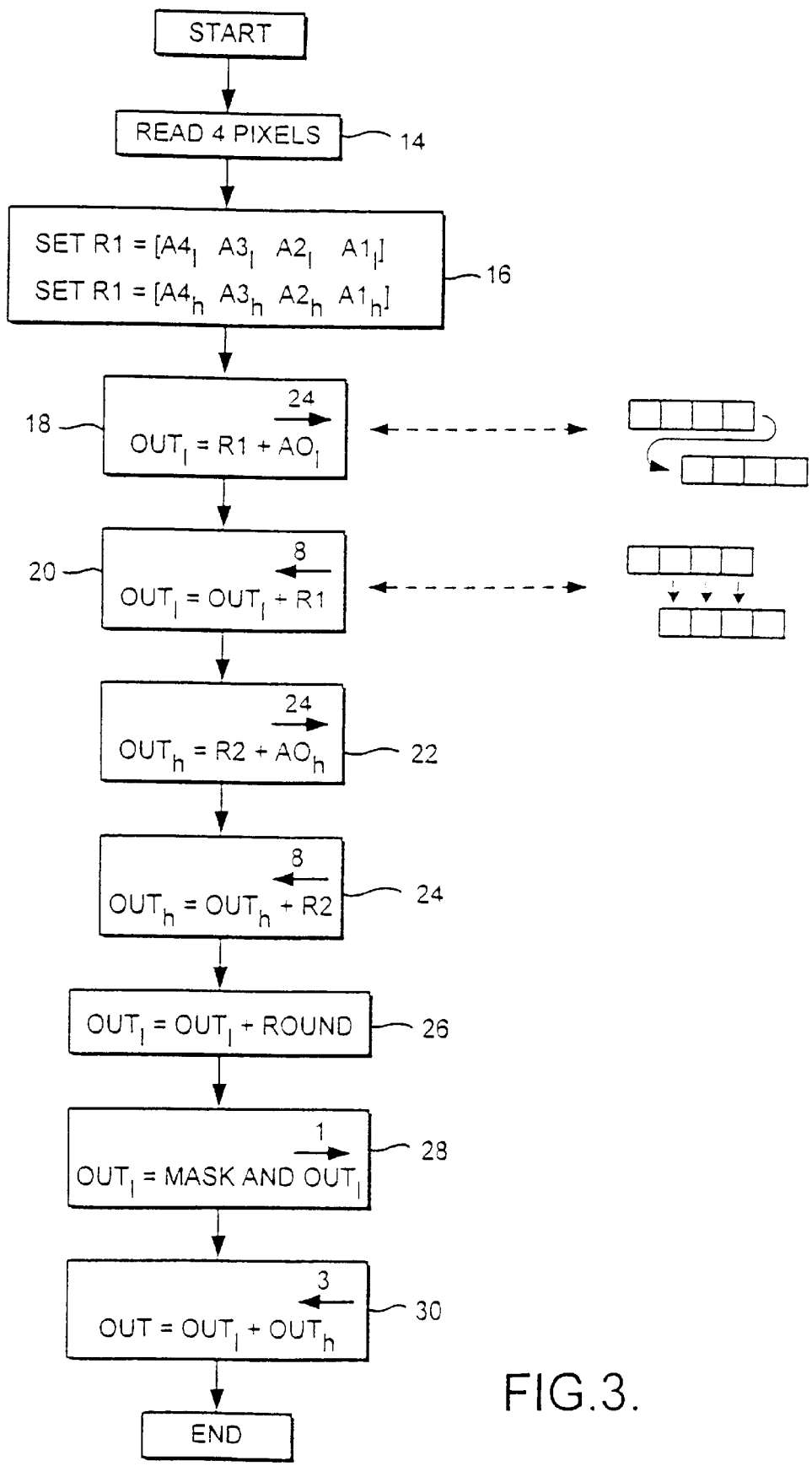
FIG. 3 is a flow diagram illustrating the technique of the invention in accordance with one example embodiment.

FIG. 3 is a flow diagram corresponding to the processing performed by the ARM instructions given above.

At step 14, the four abutting 8-bit pixel values are read from the memory system as a single 32-bit data word.

At step 16, these pixel values are separated into respective high and low order portions within two intermediate data words R1 and R2.

At step 18, the adjacent low order portion from the preceding input data word is added to the low order intermediate data word R1 of the present input data word read at step 14.

At step 20, a shifted version of the now partially processed low order multi-bit portions is added on top of itself to provide a sum of adjacent low order multi-bit portions of the pixel values.

Steps 22 and 24 repeat steps 18 and 20, but in this case for the high-order multi-bit portions.

At step 26, a rounding value is added in parallel to all of the low order multi-bit portions. The rounding value is determined by a flag within the MPEG data stream and can either be to add a binary "0" or a binary "1" to the sum of adjacent pixel values.

Step 28 serves to divide the sum of the lower order portions of the adjacent pixel values by two using a bit shift by one bit space. The logical AND with the Mask value with step 28 serves to remove any unwanted bits within the shifted low order intermediate word that have moved into the vacant portions between the multi-bit portions.

At step 30, the high order multi-bit portion is restored to its proper position subject to a division by 2 using a 3-bit position shift. At the same time, the two intermediate data words are combined by an addition to produce the desired output data word in which the pixel values are again represented as 8-bit values that abut one another.

It will be appreciated from the above that at least steps 20, 24, 26 and 28 conduct parallel processing upon the bits of a plurality of pixel values in a manner that reduces the total number of instructions required to achieve the desired result. The separation of the multi-bit portions by vacant portions stops the calculations for each pixel value interfering with one another and allows the rounding operations to be performed in parallel.

FIG. 4 is a schematic illustration of a simplified example employing the technique of one embodiment of the invention. In this example, the pixel values are 4-bit pixel values and the multi-bit portions are 2-bit portions. Line 32 represents the input pixel values within the respective input data words. Lines 34 and 36 illustrate the separation of the input pixel values into low-order and high-order portions within respective intermediate data words.

Line 38 is a rounding value that in this example is set to a binary "1" for each pixel value. Line 40 is a mask value used to remove unwanted extensions into the vacant portions after shifting operations during subsequent processing.

Line 42 shows the result of adding the low order portion of the adjacent pixel A0 to the low order portion of pixel A1 from the current input data word. Line 44 shows the result of adding together the low order portions of adjacent pixel values within the current input data word and storing these in the bit positions following the result calculated in line 42. Lines 46 and 48 are analogous to lines 42 and 44 but in this case performed in respect of the high order portions.

At line 50, the rounding value from line 38 is added to the low order result produced at line 44.

At line 52 the low order result from line 50 is right shifted by one bit position and the mask value of line 40 applied to restore the vacant portions.

Line 54 shows the combination of the high order portions from line 48 with the low order portions from line 52 that have been rounded and subject to the mask operation.

Figure 5:
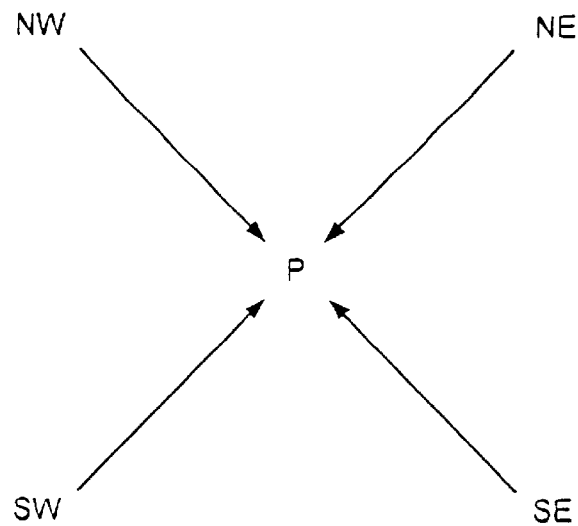
FIGS. 5 and 6 schematically illustrate a two-dimensional pixel averaging operation of a further example embodiment.
Figure 6:
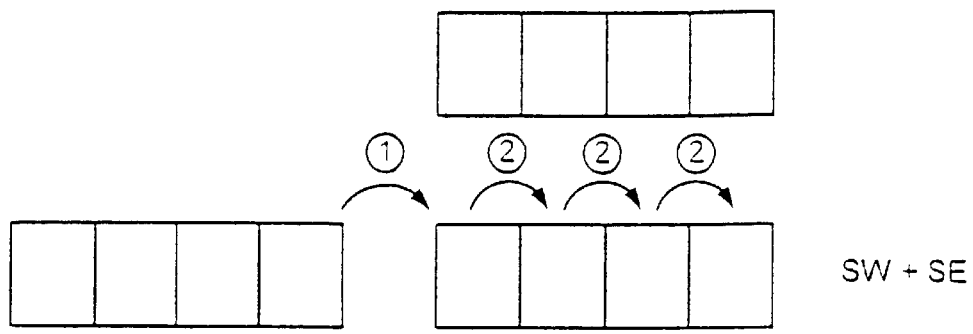
Figure 6:
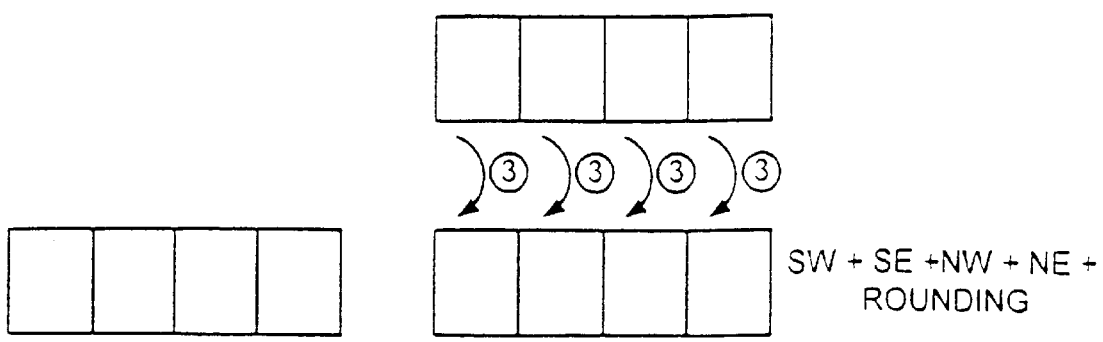

The above example relates to horizontal interpolation between pixel values. FIG. 5 schematically illustrates two-dimensional interpolation of a pixel value P at a mid-point between four pixel values NW, NE, SW, SE contained within the data stream. FIG. 6 shows in its upper portion the horizontal interpolation that is performed first from an adjacent data word and then within the current data word to form the sum of the SW and SE pixel values surrounding each pixel P to be interpolated. The lower portion of FIG. 6 illustrates the summing of vertically adjacent already horizontally summed, values to provide the sum of the SW, SE, NW and NE values surrounding the pixel P. At this stage the rounding value is also added in.

An example routine in ARM code for performing this two-dimensional interpretation is given below:

```
; mask = 0x0F0F0F0F
; pix0l = top byte is previous horizontal carry pixel (low)
; pix0h = top byte is previous horizontal carry pixel (high)
; lcar{h,l} = vertical carry (high, low) + rounding
LDR pix1, [in], #4              ; load the next 4 pixels
BIC pix1l, pix1, mask, LSL#4
AND pix1h, mask, pix1, LSR#4
; do low part first
ADD s0, pix1l, pix0l, LSR#24    ; add in horizontal carry
ADD s0, s0, pix1l, LSL#8        ; add in left shifted data
ADD s1, s0, lcarl               ; add previous row carry
ADD lcarl, s0, rounding         ; prepare next row carry
AND s0, mask, s1, LSR#2         ; divide bottom by 4
ADD s0, s0, lcarh, LSL#2        ; add in high carry
; now do high part
ADD lcarh, pix1h, pix0h, LSR#24 ; add horizontal carry
ADD lcarh, lcarh, pix1h, LSL#8  ; add in left shifted data
ADD s0, s0, lcarh, LSL#2        ; complete the computation
STR s0, [out], #4
```

Figure 7:
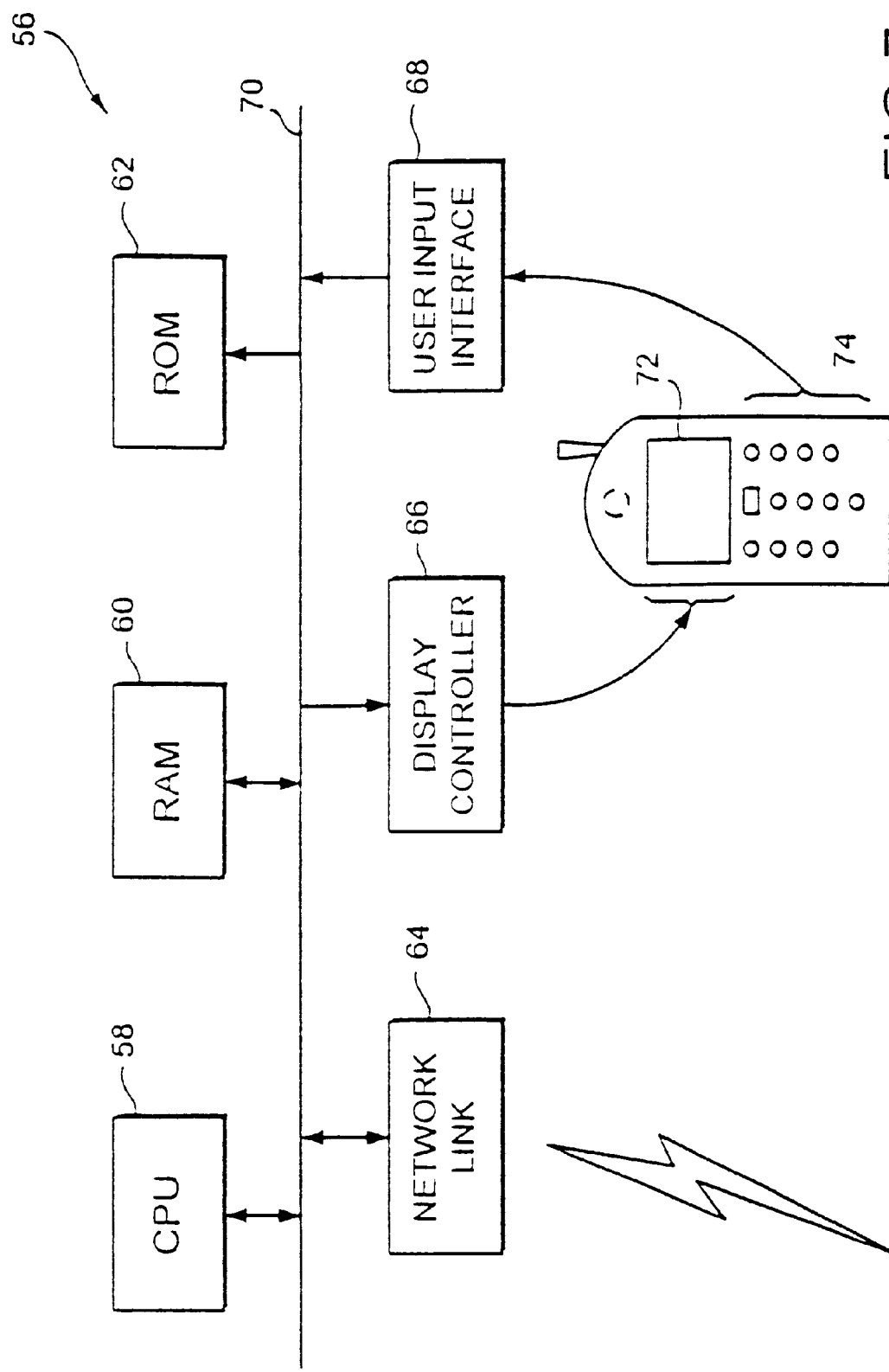
FIG. 7 schematically illustrates a data processing apparatus for performing the processing illustrated in FIGS. 1 to 6.

FIG. 7 schematically illustrates a data processing apparatus for performing the techniques described previously. The data processing apparatus 56 includes a central processing unit 58, a random access memory 60, a read only memory 62, a network link 64, a display controller 66 and a user input interface 68 all linked via a common bus 70. The display controller 66 controls a display 72 and the user input interface 68 receives signals from a keypad 74. The data processing apparatus 56 may, by way of example, form part of a mobile telephone.

In this example, MPEG video data may be received via the network link 64 and require processing to produce output video data. This processing may include the interpolation of pixel values as described above. This interpolation is performed by the central processing unit 58 operating upon the working data stored within the random access memory 60. The computer program for controlling the central processing unit 58 may be stored within the read only memory 62. Whilst in this embodiment the computer program is stored in the read only memory 62, in other embodiments it may be stored on a hard disk drive, a removable media or indeed downloaded dynamically via the network link 64 into the working memory 60.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of processing an input data word containing a plurality of abutting input data values, each input data value containing a plurality of multi-bit portions, said method comprising the steps of:
   (i) splitting said multi-bit portions of said input data values between a plurality of intermediate data words, each intermediate data word containing a plurality of said multi-bit portions taken from respective input data values, said multi-bit portions being separated by vacant portions within said intermediate data words;
   (ii) performing one or more data processing operations upon said intermediate data words, said data processing operations being such that, within at least one of said intermediate data words, a multi-bit data portion may at least temporarily extend in length into a vacant portion of said intermediate data word and one or more data processing operations performed upon at least one intermediate data word differs from one or more data processing operations performed upon a different intermediate data word; and
   (iii) combining said intermediate data words to form an output data word containing a plurality of abutting output data values each formed from a plurality of separately processed multi-bit data portions taken from respective intermediate data words.

2. A method as claimed in claim 1, wherein said steps of performing one or more data processing operations and combining together yield output data values equal to those that would be obtained by performing a desired data processing operation upon said input data values within said input data word in isolation from any abutting input data values.

3. A method as claimed in claim 1, wherein said one or more data processing operations include an addition operation performed upon at least one of said intermediate data words such that said addition operation acts in parallel upon all of said multi-bit data portions within said intermediate data word.

4. A method as claimed in claim 1, wherein said one or more data processing operations include a shift operation performed upon at least one of said intermediate data words such that said shift operation acts in parallel upon all of said multi-bit data portions within said intermediate data word.

5. A method as claimed in claim 1, wherein said input data values represent adjacent signal values within a stream of signal values being processed.

6. A method as claimed in claim 5, wherein said data values represent adjacent pixel values.

7. A method as claimed in claim 1, wherein said steps of performing one or more data processing operations and combining are such as to average adjacent data values within said input data word.

8. A method as claimed in claim 7, wherein said one or more data processing operations include adding rounding values in parallel to a plurality of multi-bit data portions within an intermediate data word.

9. A method as claimed in claim 1, wherein said input data word is split into a first intermediate data word and a second intermediate data word.

10. A method as claimed in claim 9, wherein high-order multi-bit portions of said input data values spaced by vacant portions form said first intermediate data word and low-order multi-bit portions of said input data values spaced by vacant portions form said second intermediate data word.

11. A method as claimed in claim 1, wherein said one or more data processing operations include a shifted add operation performed upon at least one of said intermediate data words such that a shift version of an intermediate data word is added to a non-shifted version of said intermediate data word such that sums of a plurality of adjacent multi-bit portions are calculated in parallel.

12. A method as claimed in claim 1, wherein said input data word is a 32-bit input data word formed of four 8-bit input data values, said 8-bit input data values being split into high-order 4-bit portions within a high-order intermediate data word and low-order 4-bit portions within a low-order intermediate data word.

13. Apparatus for processing an input data word containing a plurality of abutting input data values, each input data value containing a plurality of multi-bit portions, said apparatus comprising:
   (i) splitting logic operable to split said multi-bit portions of said input data values between a plurality of intermediate data words, each intermediate data word containing a plurality of said multi-bit portions taken from respective input data values, said multi-bit portions being separated by vacant portions within said intermediate data words;
   (ii) processing logic operable to perform one or more data processing operations upon said intermediate data words, said data processing operations being such that, within at least one of said intermediate data words, a multi-bit data portion may at least temporarily extend in length into a vacant portion of said intermediate data word and one or more data processing operations performed upon at least one intermediate data word differs from one or more data processing operations performed upon a different intermediate data word; and
   (iii) combining logic operable to combine said intermediate data words to form an output data word containing a plurality of abutting output data values each formed from a plurality of separately processed multi-bit data portions taken from respective intermediate data words.

14. A computer program product including a computer program for controlling a data processing apparatus to perform data processing in accordance with a method as claimed in claim 1.

* * * * *